US005347624A

United States Patent [19]

Takanashi et al.

[11] Patent Number: 5,347,624

[45] Date of Patent: Sep. 13, 1994

[54] METHOD AND APPARATUS FOR DISPLAY CONTROL

[75] Inventors: Katsuya Takanashi, Hadano; Shouji Nakamura, Yokohama; Takashi Akaosugi, Hadano; Tomihiko Kojima, Machida; Tooru Takahashi, Yokohama; Ritsuo Shirahama, Hadano, all of Japan

[73] Assignee: Hitachi, Ltd., Tokyo, Japan

[21] Appl. No.: 518,334

[22] Filed: May 7, 1990

Related U.S. Application Data

[63] Continuation of Ser. No. 152,485, Feb. 5, 1988, abandoned.

[30] Foreign Application Priority Data

Mar. 5, 1987 [JP] Japan ........ 62-51023
Mar. 19, 1987 [JP] Japan ........ 62-65427

[51] Int. Cl.[5] ........ G06F 15/20
[52] U.S. Cl. ........ 395/157
[58] Field of Search ........ 364/518, 519, 521, 523; 340/723; 395/157, 155, 156, 161, 133, 135; 345/113, 114

[56] References Cited

U.S. PATENT DOCUMENTS 4,550,315 10/1985 Bass et al. ........ 340/703
4,641,197 2/1987 Miyagi ........ 364/523 X
4,692,757 9/1987 Tsuhara et al. ........ 340/721
4,700,320 10/1987 Kapur ........ 364/521
4,706,205 11/1987 Akai et al. ........ 364/518
4,775,946 10/1988 Anjyo ........ 364/522
4,779,210 10/1988 Katsura et al. ........ 364/521
4,780,710 10/1988 Tatsumi ........ 340/721

FOREIGN PATENT DOCUMENTS 154538 12/1983 Japan .
039158 7/1984 Japan .

*Primary Examiner*—Phu K. Nguyen
*Attorney, Agent, or Firm*—Antonelli, Terry, Stout & Kraus

[57] ABSTRACT

A graphic display method and apparatus including a plurality of virtual device coordinate systems independent of a coordinate system of a physical screen in which a graphic image to be displayed is independently drawn in a virtual device space of the corresponding virtual device coordinate system so as to map a specified area of each virtual device space onto the virtual screen at a specified position, thereby displaying a specified area of a virtual memory in a physical screen. Furthermore, code data of characters and graphics and image data are written in a logical screen buffer as drawing elements to be located at arbitrary positions of the logical screen such that a unit, specifying an area which is located at an arbitrary position and which has an arbitrary size in the logical screen causes the combining and editing of character, graphic, and image data already written in the specified area of the logical screen and the generating, as a result, of new image data. The new image data is written as a drawing element of the virtual screen in the virtual screen buffer at a specified arbitrary position.

13 Claims, 8 Drawing Sheets

METHOD AND APPARATUS FOR DISPLAY CONTROL

This application is a continuation of application Ser. No. 152,485, filed on Feb. 5, 1988, now abandoned.

BACKGROUND OF THE INVENTION

The present invention relates to a display control system in a multiple window system, and in particular, to a graphic display control system suitable for displaying a plurality of independent characters and graphics in a virtual screen when drawing the characters, graphics, and image or picture data and to a picture display control system suitable for combining the characters, graphics, and image data so as to display edited results of the image data.

In the graphic display system, a large virtual screen space greater than a physical screen space is generally established, at least one graphic image is copied onto the virtual screen space, and a portion of the areas in the virtual screen space is specified so as to be displayed on a physical screen space of a display apparatus or the like. In such a case, according to the prior art technology, a logical coordinate space equivalent to the coordinate system associated with the physical screen space is prepared, a graphic image to be displayed is edited and is drawn by use of the logical coordinate space, and a desired area of the logical coordinate space is copied onto the virtual screen space.

Incidentally, for example, Japanese Patent Unexamined Publication No. 59-154538 includes a description concerning the graphic display technology of this kind.

Furthermore, in the conventional display control apparatuses, for example, operating in the multiple window system, when combining characters, graphics, and picture or image data to generate a new image data, code data associated with the characters and graphics are once converted into dot images, which are then developed together with the image data into a full dot memory; thereafter, the data is sequentially transferred from the full dot memory to the display equipment.

For example, Japanese Patent Unexamined Publication No. 61-39158 includes a description associated with the apparatus of this kinds.

According to the first example of the prior art technology above, since there-is provided only one logical coordinate space equivalent to the physical screen space for an application program to edit and to draw a graphic image, in a case where a plurality of graphic images are to be displayed, if it is desired to change a location or the like of a graphic image thereof, the positional relationships with respect to the other graphic images are required to be considered; furthermore, positions of other graphic images may also be required to be shifted in some cases. As a consequence, it is impossible to effect an independent editing of the graphic image in the graphic image unit, which leads to a problem that the load is accordingly burdened on the application program.

Moreover, in the second example of the prior art technology above, since the code data of the characters and graphic images are to be kept together with the image data in a form of a dot image, there arises a problem that an operation to edit the characters and the graphic data again into code data is attended with a difficulty.

SUMMARY OF THE INVENTION

It is therefore an object of the present invention to provide a system in which an independent editing in the graphic image unit is enabled in the logical coordinate space and the code data of the characters and graphics and the image data can be simply combined and edited at a high speed, thereby relieving the application program from the load when editing and drawing the characters, graphics, and image data.

According to the present invention, the object above can be achieved by a display control method comprising the following steps of disposing in a system a plurality of independent virtual device coordinate systems each independent of a coordinate of a physical screen and effecting an edit processing of a graphic image to be displayed in virtual device space of virtual device coordinate system associated with the graphic image so as to independently copy the graphic image thus edited onto the respective virtual screen space; and specifying a rectangle or the like having an arbitrary position and an arbitrary size in the virtual memory and combining data in rectangle specified in virtual screen by effecting such operations as to superimpose patterns included in character data, graphic data, and image data so as to attain a pattern constituting new image data, which is written as a drawing element of the virtual screen at a specified arbitrary position of the virtual screen.

The present invention can be summarized as follows.

First, the respective virtual device coordinate systems are independent of each other as well as of the coordinate system of the physical screen. Consequently, even when such editing operations as a deletion, an addition and a shift of a graphic image are accomplished in a space associated with a virtual device coordinate system, the editing operations do not influence the other virtual device coordinate systems. That is, the application program can independently edit the data in the graphic image in the pertinent virtual device coordinate system without considering the arrangement and the like of the other graphic images. Incidentally, the arrangement and the like between the graphic images need only be considered when a graphic image edited and drawn according to the virtual device coordinate system is copied onto the virtual screen.

Furthermore, in a display control apparatus operating in the multiple window system, there is provided a virtual screen having an arbitrary size with respect to the real screen and the code data of characters and graphics as well as the image data are written in the virtual screen. An operation to display data in a display equipment (physical screen) is effected through defining in the virtual screen an area to be actually displayed and through developing the data of the area in a full dot memory.

That is, a combine processing to combine the code data of characters and graphics and the image data is effected as a processing in the virtual screen. As a result, it is made unnecessary to develop the code data of characters and graphics into dots for the combine processing and to sequentially transfer the dots to the memory (full dot memory) for the editing, which enables the combine processing to be achieved at a high speed. Moreover, since the character data and graphic data are kept as code data in the virtual screen, the re-editing operation is facilitated for the following reasons. Namely, the character data and graphic data in the form of code data are quite small in the data amount as compared with the image data in general; furthermore, the font patterns of characters are stored in a read-only memory (ROM) in most display apparatuses and hence the patterns need not be retained; as a consequence, it facilitates the editing operation to keep the pattern displayed or generated as a character or a graphic image in the form of the original code data rather than to keep the pattern in the form of an image data.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
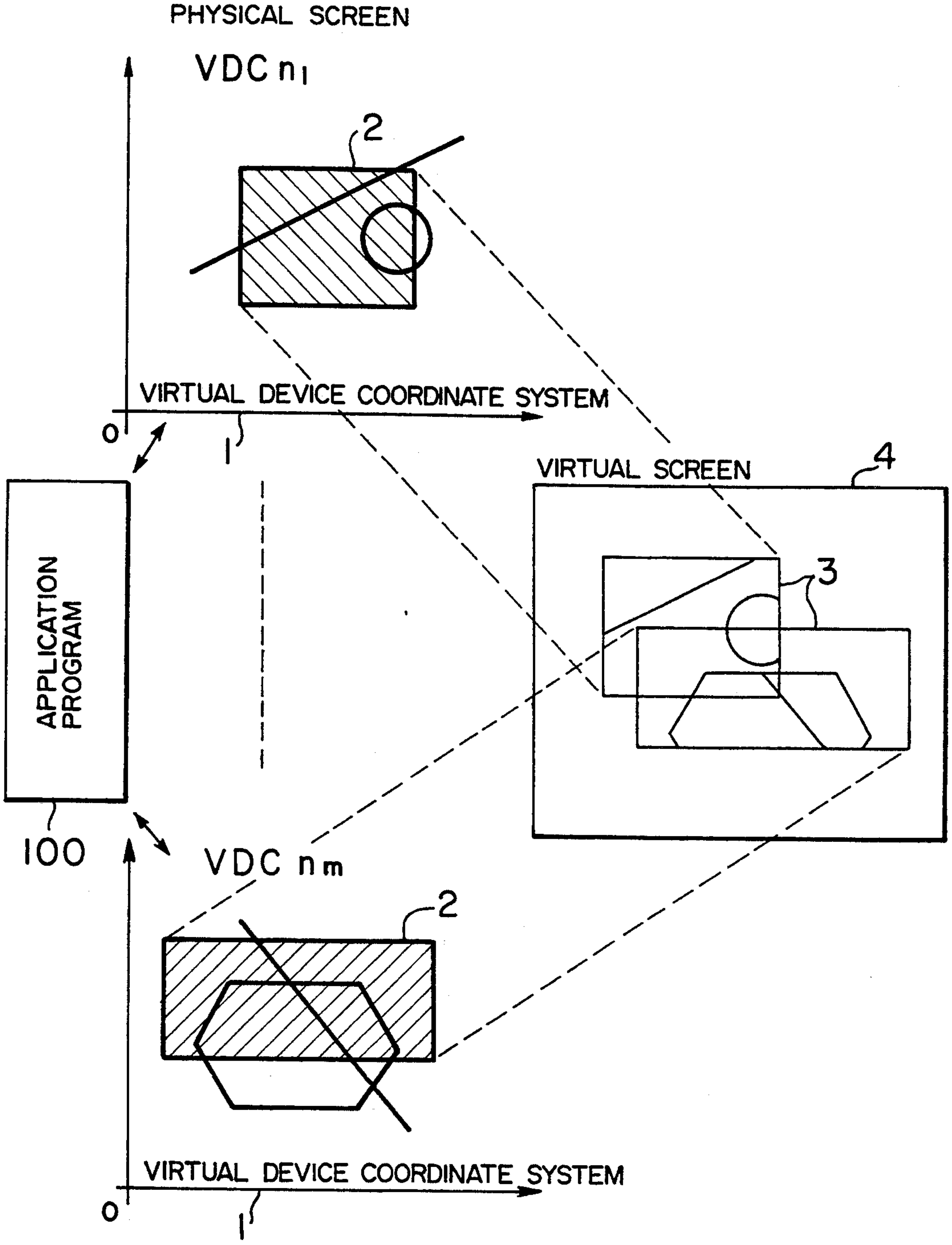
FIG. 1 is a schematic diagram for explaining the concept of the present invention.

Referring now to the drawings, a description will be given of an embodiment according to the present invention.

FIG. 1 is a schematic diagram for explaining the concept of the present invention in which an application program 100 keeps a virtual device coordinate system 1 (VDC) as a logical display space for the respective drawing contents. The VDC 1 is equivalent to a display apparatus related to the application program in the conventional display system; however, according to the present invention there are used a plurality of independent VDC's each independent of the display apparatus.

The VDC 1 provides a logical space greater than the size of the physical screen and that of the virtual screen 4 and is configured such that in order to develop a portion of the content of the VDC 1 in the virtual screen 4, a display area 2 (to be referred to as a window herebelow) is defined as an area actually displayed in the VDC 1 and a display area 3 (to be referred to as a view port herebelow) is defined in the virtual screen 4 onto which a graphic image defined in the VDC 1 is to be copied. A plurality of windows 2 can be defined in the VDC space, namely, a rectangular area is defined by assigning the coordinate values of the lower-left point and the upper-right point in a two-dimensional normalized coordinate system of which the origin is located at the lower-left corner of the VDC 1. Furthermore, the view port 3 in the virtual screen 4 is used such that the window 2 is mapped onto the view port 3 with a one-to-one magnification or reduction ratio (the ratio is arbitrarily specified), thereby displaying the content thereof. The view port 3 is a rectangular area defined by assigning the coordinate values of the lower-left point and the upper-right point in a two-dimensional coordinate system of the virtual screen 4; furthermore, since a plurality of view ports 3 can be defined with duplication or overlapping therebetween, a display priority control is effected in a case of the duplication or overlapping. As the display priority control for the overlapped data, for example, an instruction can be issued from the application program 100 for the priority of the upper data or the lower data or for a combination of data.

Figure 2:
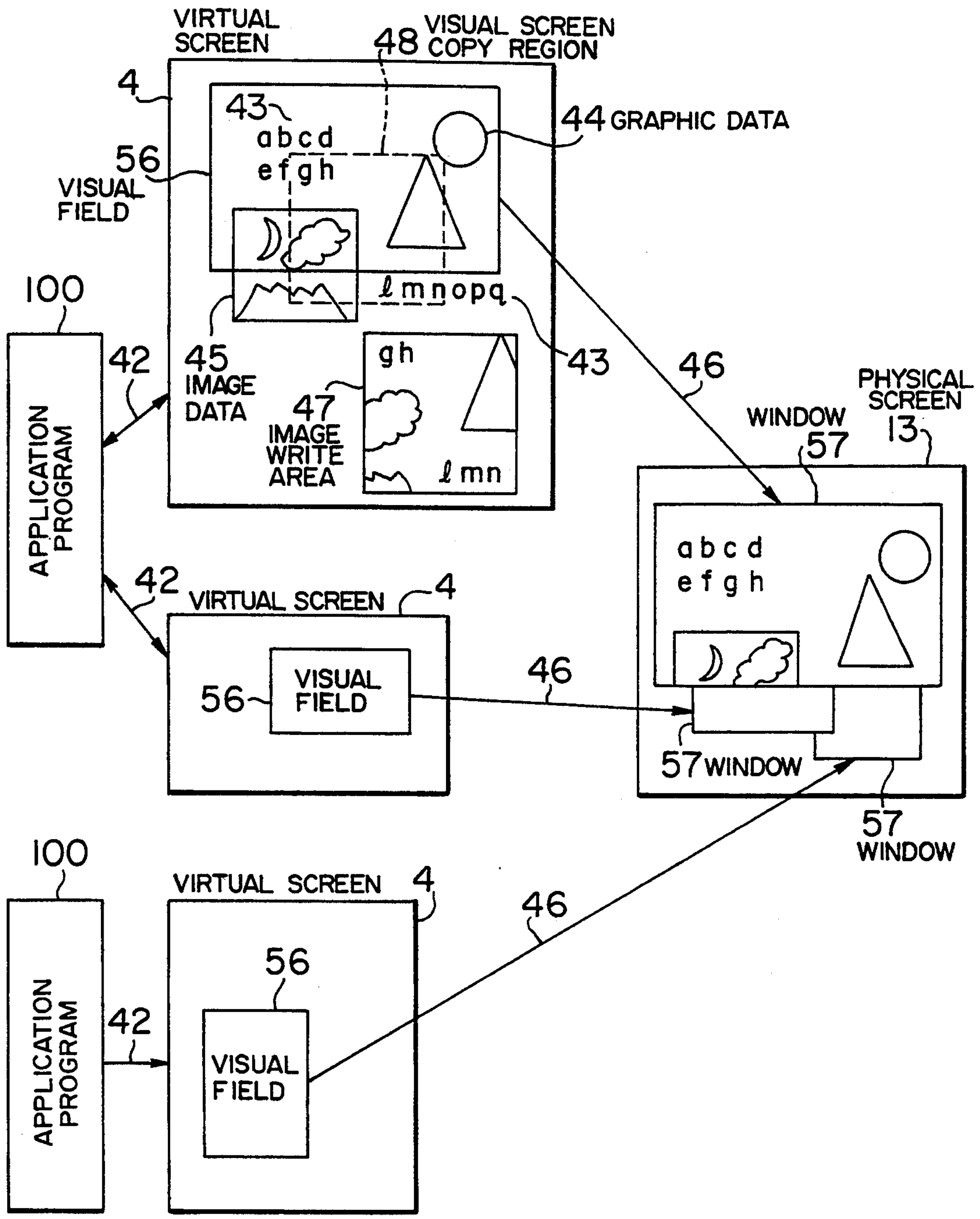
FIG. 2 is an explanatory diagram useful to explain an image data combine operation in a logical screen according to the present invention.

In the mechanism above, the application program 100 can use a plurality of VDC's 1 logically independent of each other. When constructing a final display image in the virtual screen 4, the application program 100 combines the mapping relationships between the window 2 and the view port 3 so as to issue a display instruction for the data associated with the respective VDC's independently of the display contents of the respective $VDCn_1$. FIG. 2 is an explanatory diagram useful to explain an image processing according to the present invention in which an application program 100 keeps at least one virtual screen 4 for each application content. The application program 100 can handle the virtual screen 4 such that each element of character data 43, graphic data 44, and image or picture data 45 is edited in the segment unit so as to write the segment in a duplicate fashion at an arbitrary location and to read a segment therefrom (an arrow mark 42). Furthermore, the virtual screen 4 possesses an arbitrary size with respect to a physical screen 13 which is generally equivalent to a cathode-ray tube (CRT). If the entire virtual screen 4 cannot be developed in the physical screen 13 at a time, the contents of a plurality of virtual screen 4 are simultaneously developed in the physical screen 13. For this purpose, a display area 56 (to be referred to as a view or view port herebelow) can be defined as an area of the virtual screen 4 to be actually displayed. The view port 56 is a rectangular area defined by assigning the coordinate values of the lower-left point, x-directional length, and y-directional length of the view port 56 in a two-dimensional coordinate system of which the origin is located at the upper-left corner of the virtual screen 4. The view port 56 is mapped onto a rectangular area 57 (to be referred to as a window herebelow) in the physical screen 13 so as to display the content thereof. There exist the one-to-one correspondences of the size and the number between the view ports 56 and windows 57 (an arrow mark 46). The window 57 is a rectangular area defined by assigning the coordinate values of the upper-left point thereof in a two-dimensional coordinate system of which the origin is located at the upper-left corner of the physical screen 13. Since a plurality of windows 57 can be specified in a duplicated fashion, the window 57 belonging to a lower layer is displayed in the physical screen 13 in a state where a portion is omitted.

In the virtual screen 4 displayed in the physical screen 13 in the fashion described above, an image data write area 47 is defined. The image data write area 47 is a rectangular area with an arbitrary size defined by assigning the coordinate values of the upper-left point thereof in a two-dimensional coordinate system of which the origin is located at the upper-left corner of the virtual screen 4. For the image data write area 47, a virtual screen copy area 48 is defined in the virtual screen 4. The virtual screen copy area 48 is a rectangular area defined by assigning the coordinate values of the upper-left point, x-directional length, and y-directional length thereof in a two-dimensional coordinate system of which the origin is located at the upper-left corner of the virtual screen 4. The definition of the virtual screen copy area 48 enables to select for the combination thereof a character pattern, a graphic pattern, and image data in the virtual screen copy area 48 from the character patterns of character string data 43, the graphic patterns of graphic data 44, and the image data 45 already written in the virtual screen 4 so as to generate new image data of which the size is identical to that of the virtual screen copy area 48 and to write the obtained new image data in the image write area 47. Like the image data, if the image data written in the image write area 47 includes a portion contained in a visual field 56, the portion can be displayed in the physical screen 13; furthermore, the data can be specified as an object of operations to combine new image data and to read new image data.

Figure 3:
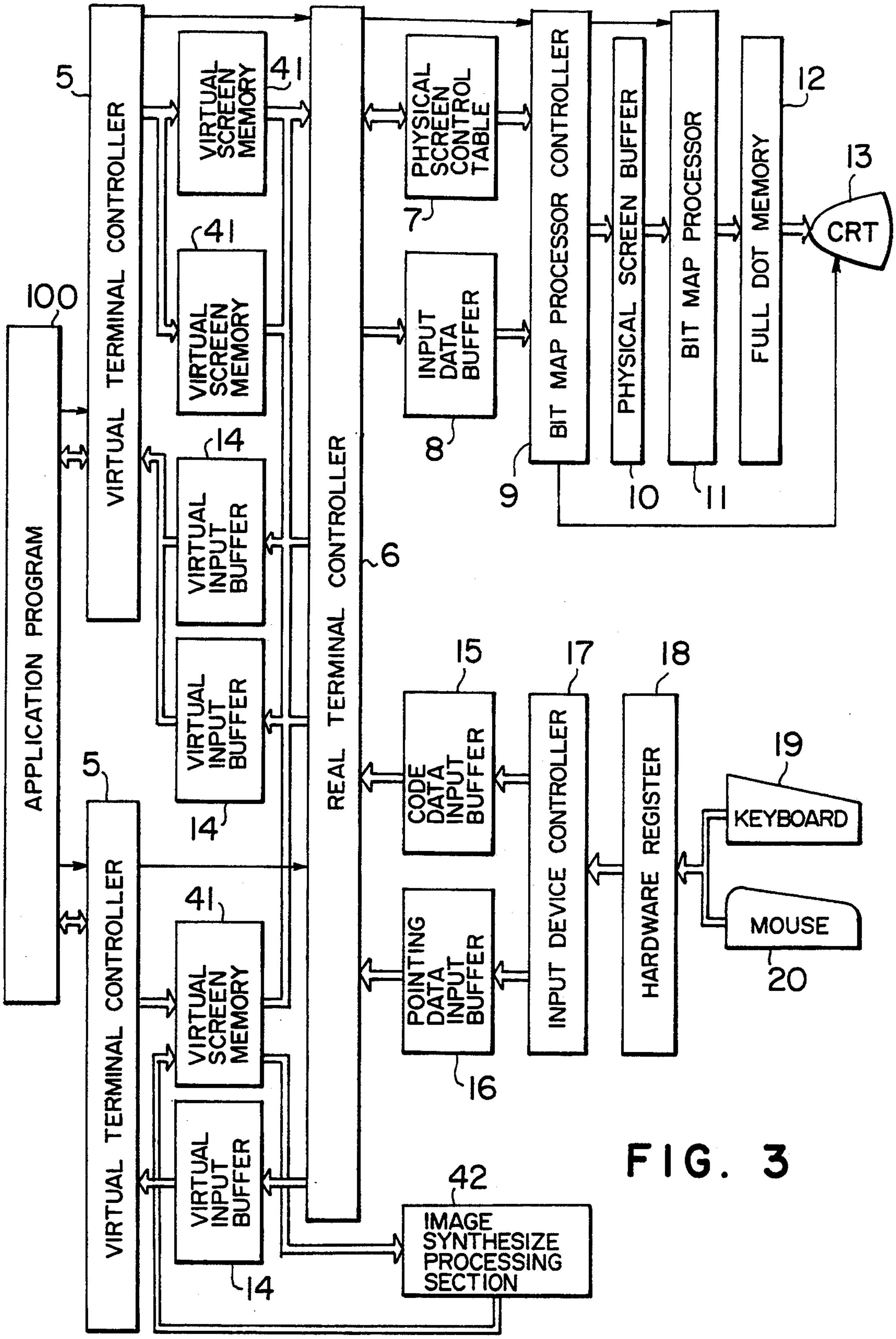
FIG. 3 is a schematic block diagram showing an embodiment of a display control apparatus according to the present invention.

FIG. 3 is a block diagram showing a configuration of the display controller as an embodiment according to the present invention in which virtual screen memories 41 are employed to store therein the virtual screens 4 of FIG. 1. A plurality of virtual screen memories 41 are provided because a multiple window display is assumed to be effected. The following description will be given in consideration of a virtual screen memory 41, namely, a virtual screen 4.

First, a description will be given of a display system. Defining a virtual screen 4 and a visual field 56 and a window 57 corresponding to the virtual screen 4 to a virtual terminal controller 5, an application program 100 writes via a virtual terminal controller 5 the character, graphic, and image data in the segment unit (a set of elements to be accessed at a time for an editing operation thereof) in a virtual screen memory 41 controlled by the virtual terminal controller 5, which as a result initiates the display system.

The virtual terminal controller 5 controls the segment data in the virtual screen memory 41 and generates in the virtual screen memory 41, in addition to the data to be displayed, the information common to the real terminal controller 6, namely, the information including attributes of each segment such as a position, a size, a transparent or nontransparent characteristic and kinds and display priority levels of the character, graphic, and image data. The real terminal controller 6 generates a physical screen control table 7 (to be described later) based on information specifying the visual field 56 and the window 57 defined by the application program 100 via the virtual terminal controller 5. Using the physical screen control table 7, information necessary to be developed in the physical display screen of the CRT 13 is selected from the segment data so as to be drawn in the segment unit in the virtual screen memory 41, namely, the virtual screen 4; furthermore, according to a drawing indication for a pertinent virtual screen 4, an entry number indicating a view port 3 is generated depending on rectangular area information in the physical screen control table 7.

Based on the segment data and the entry number, a bit map processor controller 9 generates in a physical screen buffer 10 a command stream for a bit map processor 11. In this situation, the bit map processor controller 9 sets in the physical display screen of a full dot memory 12 to be developed in the CRT 13 a drawing enable area, namely, an area where an image can be drawn in the physical display screen of the CRT 13 based on the rectangular area information in the physical screen control table 7 and establishes in a physical screen buffer 10 as a command positions where the character, graphic, and image data are drawn according to the two-dimensional coordinate system of which the origin is located at the upper-left corner of the full dot memory 12. The physical screen buffer 10 is loaded with a size of each character area, a develop direction, and a character pattern number for the character data; a vector command specifying the drawing coordinates, a shading pattern designating an internal state of the display graphic image, and a marker pattern denoting a pattern to mark the coordinates are set in the case of the graphic data; and a command indicating MH/MR compression code data and the size of the rectangular area is stored for the image data.

The bit map processor 11 interprets the command sequence in the physical screen buffer 10 so as to develop the character, graphic, and image data into dots in the full dot memory 12. In this operation, it is judged whether or not the pertinent dot is included in the drawing enable area such that only the dot portion included therein undergoes the dot development. The CRT 13 displays the contents of the full dot memory 12.

Next, a description will be given of an image synthesize or combine processing.

On receiving from the application program 100 the virtual screen copy area 48 and the image write area 47 of the virtual screen 4 thus defined, the virtual terminal controller 5 sends, together with information defining the virtual screen copy area 48 and the image write area 47, the character code data, graphic code data, and image data from the image copy area 48 to an image synthesize processing section 42.

The image synthesize processing section 42 develops the character, graphic, and image data stored in the virtual screen copy area 48 into dots in the image write area 47 of the virtual screen 4.

When there exists an intersection between the image write area 47 and the view port 56, the bit map processor 11 is supplied via the real terminal controller 6 and the bit map processor controller 9 with information defining the visual field 56 and the window 57 as well as information defining the image write area 47 and the dot pattern developed in the image write area 47, namely, the combined or synthesized image data. The bit map processor 11 develops in the full dot memory 12 the image data contained in the drawing enable area so as to immediately reflect the results of the synthesize or combine operation of the image data to the display on the CRT 13.

The input system will now be described. A trigger signal of data input supplied from a code input apparatus 19 such as a keyboard or a physical input device of a pointing device 20 such as a mouse is trapped as an interruption by an input device controller 17, and then data set to a hardware register 18 is loaded in a code data input buffer 15 and a pointing data input buffer 16, which as a result initiates the input system.

The contents of the code data input buffer 15 and the pointing data input buffer 16 are read by the real terminal controller 6, which in turn classifies the data into input data to the application program 100 and data indicating a control of the physical screen. The real terminal controller 6 determines, depending on drawing enable area information in the physical screen control table 7 and the input data distributed to the application processor 100, the upper-most virtual terminal (virtual screen) currently displayed in the physical screen so as to store the input data in a virtual input buffer 14 controlled by the virtual terminal controller 5 corresponding to the pertinent virtual screen memory 41. The input data thus stored in the virtual input data buffer 14 is reported as an answer from the virtual terminal controller 5 to the application program 100 in response to a read request issued from the application program 100 to the virtual terminal controller 5. Depending on the input data, the application program 100 updates the contents of the virtual screen memory 41.

Figure 4:
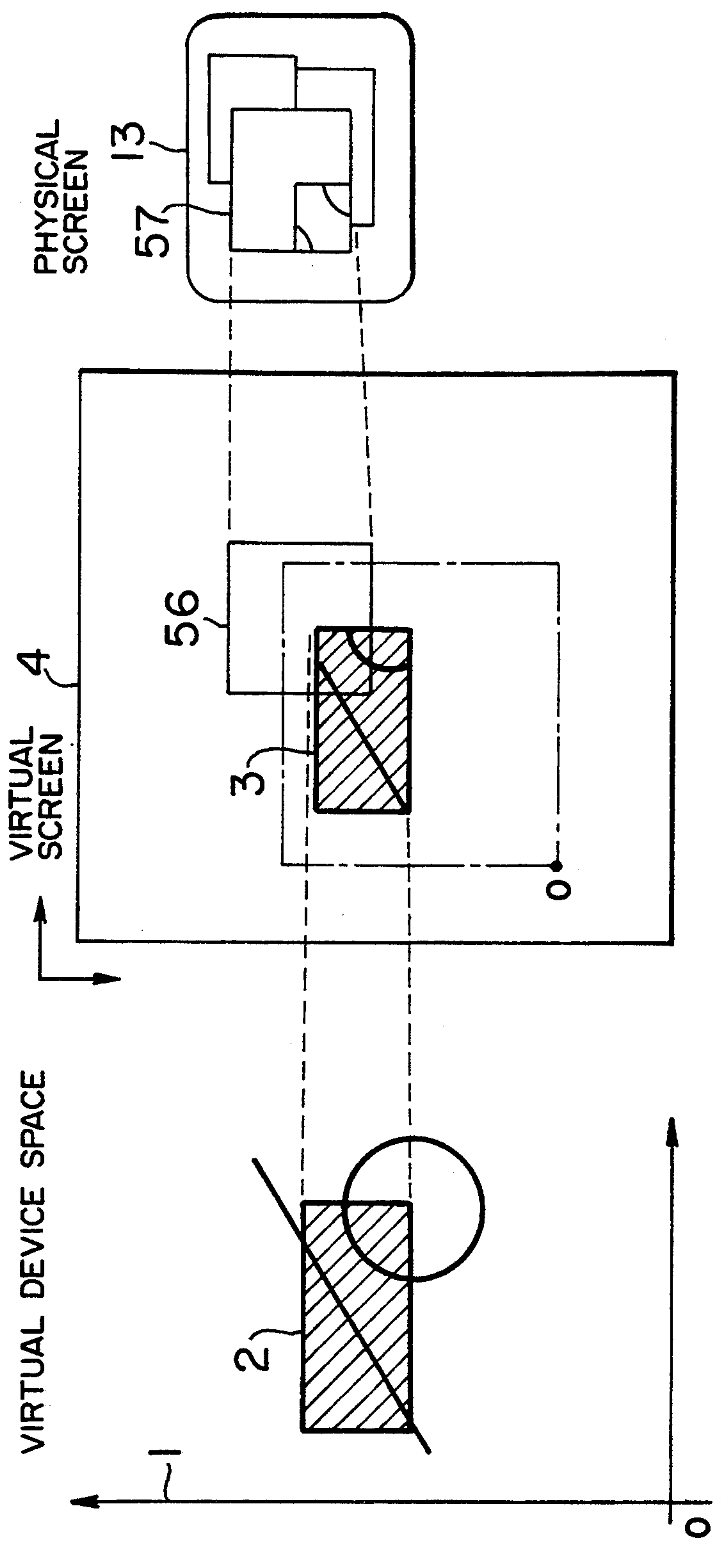
FIG. 4 is a schematic diagram illustrating a copy mechanism of a copy from a virtual device space onto a physical screen space according to the present invention.
Figure 5:
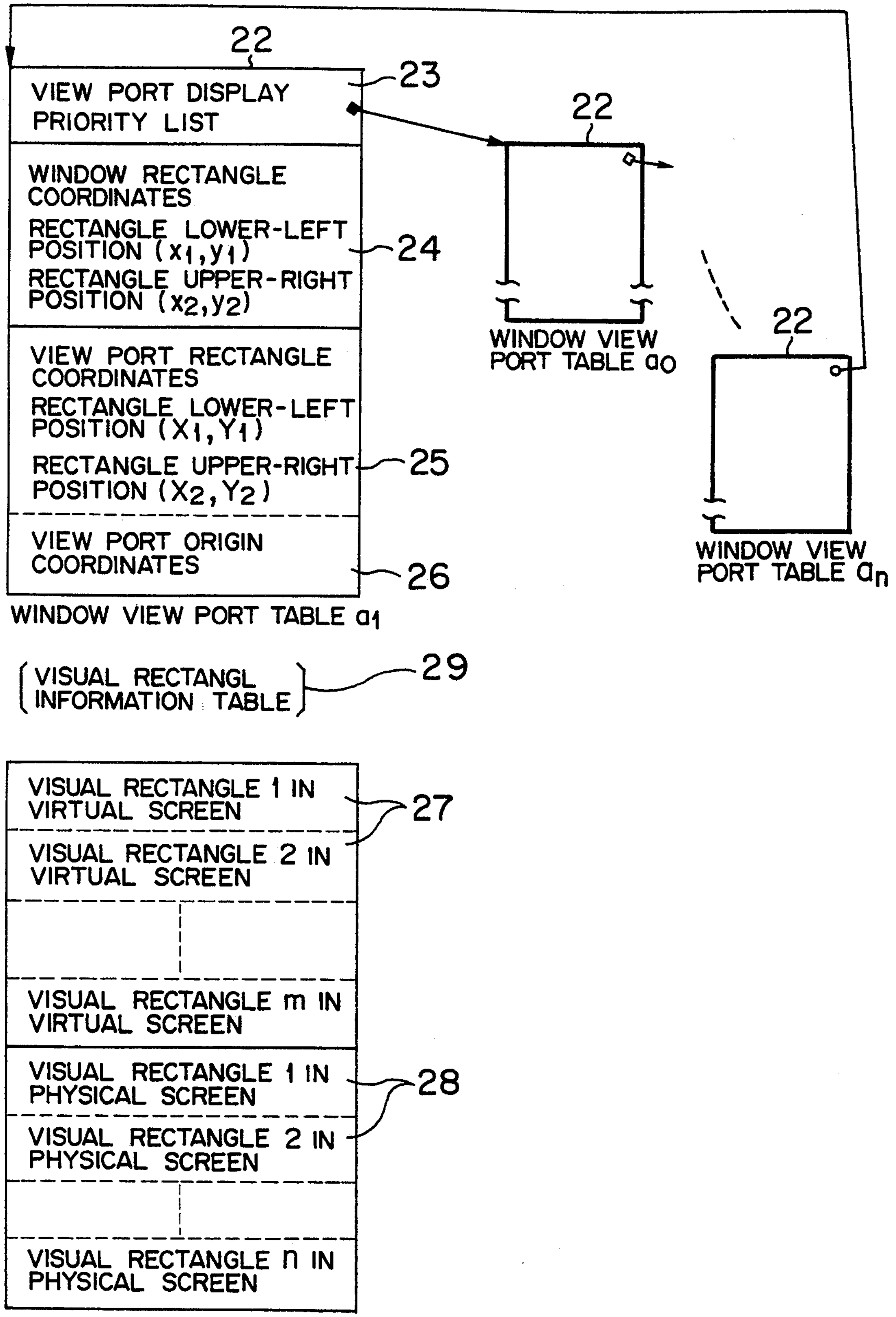
FIG. 5 is a schematic diagram depicting table information necessary for the copy mechanism of FIG. 4.

FIG. 4 is a schematic diagram showing a mechanism in which information is mapped from the virtual device coordinate system onto the actual physical coordinate system to effect a graphic display. FIG. 5 shows tables necessary for the operations associated with the mechanism of FIG. 4. These tables are prepared in the physical screen control table 7 of FIG. 3.

Graphic data such as a direct line or a circle is indicated from the application program 100 in a virtual device space according to the virtual device space coordinate system 1. The graphic data thus specified from the application program 100 is mapped onto the virtual device space (virtual screen 4) by effecting a multiplication between each graphic data and a coordinate conversion ratio attained from a window rectangle coordinate value 24 and a view port rectangle coordinate value 25 in a window view port table 22. Furthermore, a location where the graphic data is to be arranged in the virtual screen 4 is determined by use of information of a view port origin coordinate 26 in the window view port table 22. Next, when actually mapping the graphic data thus mapped onto the virtual screen space onto the physical screen, since the drawing in the physical display screen of the CRT 13 is accomplished in the bit map system in this embodiment as described above in conjunction with FIG. 3, a command stream for the bit map processor 11 is generated from the graphic data mapped onto the virtual screen space, thereby displaying the graphic data on the CRT 13.

In this case, according to the present invention, in order to enable the mapping from the virtual device space of plural VDC's 1 onto the virtual screen space, there is disposed a window view port table 22 for each mapping relationship from each virtual device space onto the virtual screen space, thereby effecting the objective mapping control. Furthermore, when a plurality of virtual device spaces are mapped onto the virtual screen space, the display is accomplished by sequentially using the pointers of the view port display priority list in the window view port table 22. In the embodiment according to the present invention, however, since the duplication is completely allowed in the mapping relationships between a plurality of visual fields 56 and a plurality of windows 57, in order to prevent a duplicate display instruction in an overlapped portion, edit information of rectangles not overlapped is generated from overlap information such that a command stream to be interpreted by the bit map processor 11 is generated by referring to a visual rectangle information table 29 with the generated edit information, thereby drawing data in the physical screen.

Figure 6:
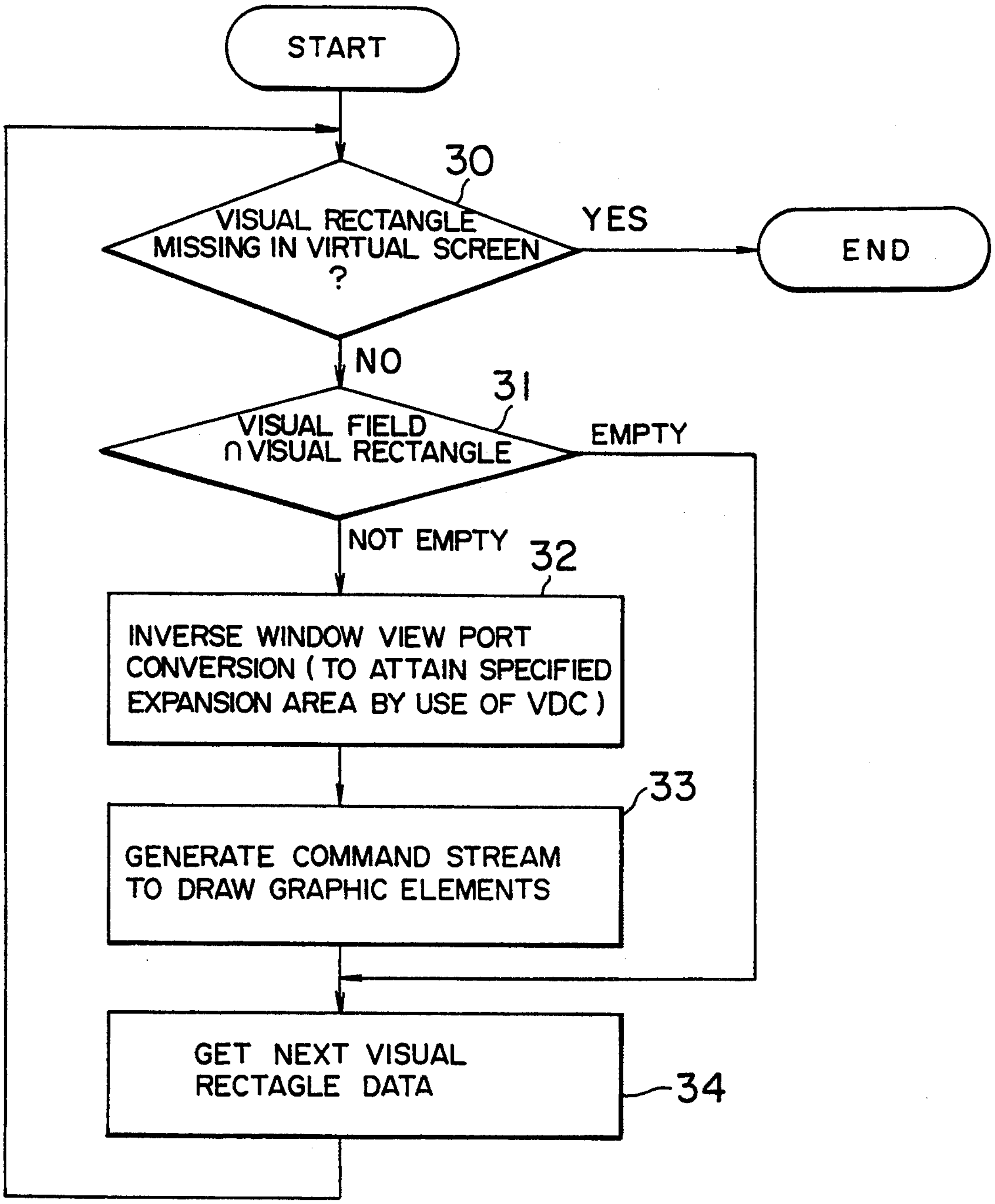
FIG. 6 is a flowchart showing a processing in a display system.

FIG. 6 is a flowchart showing an operation to actually display data. This processing is effected by the bit map processor controller 9 of FIG. 3. When the display instruction is received, it is judged whether or not the pertinent data is actually visible in the physical display screen based on information of the visual field 56 defined in the physical screen control table 7 and information associated with the visible rectangle 27 in the virtual screen stored in the visual rectangle information table 29 (steps 30–31). If it is found that there exists a visible portion as result of the check, a specified develop area is obtained by use of the window view port table 22 through an inverse conversion into the VDC coordinate space (step 32). In the specified develop area information, graphic element data is searched so as to generate a graphic element drawing command stream to be interpreted by the bit map processor 11 (step 33). For the display of the data, this sequence of operations is repeated as many times as there are visual rectangle information items in the virtual screen (step 34).

Figure 7:
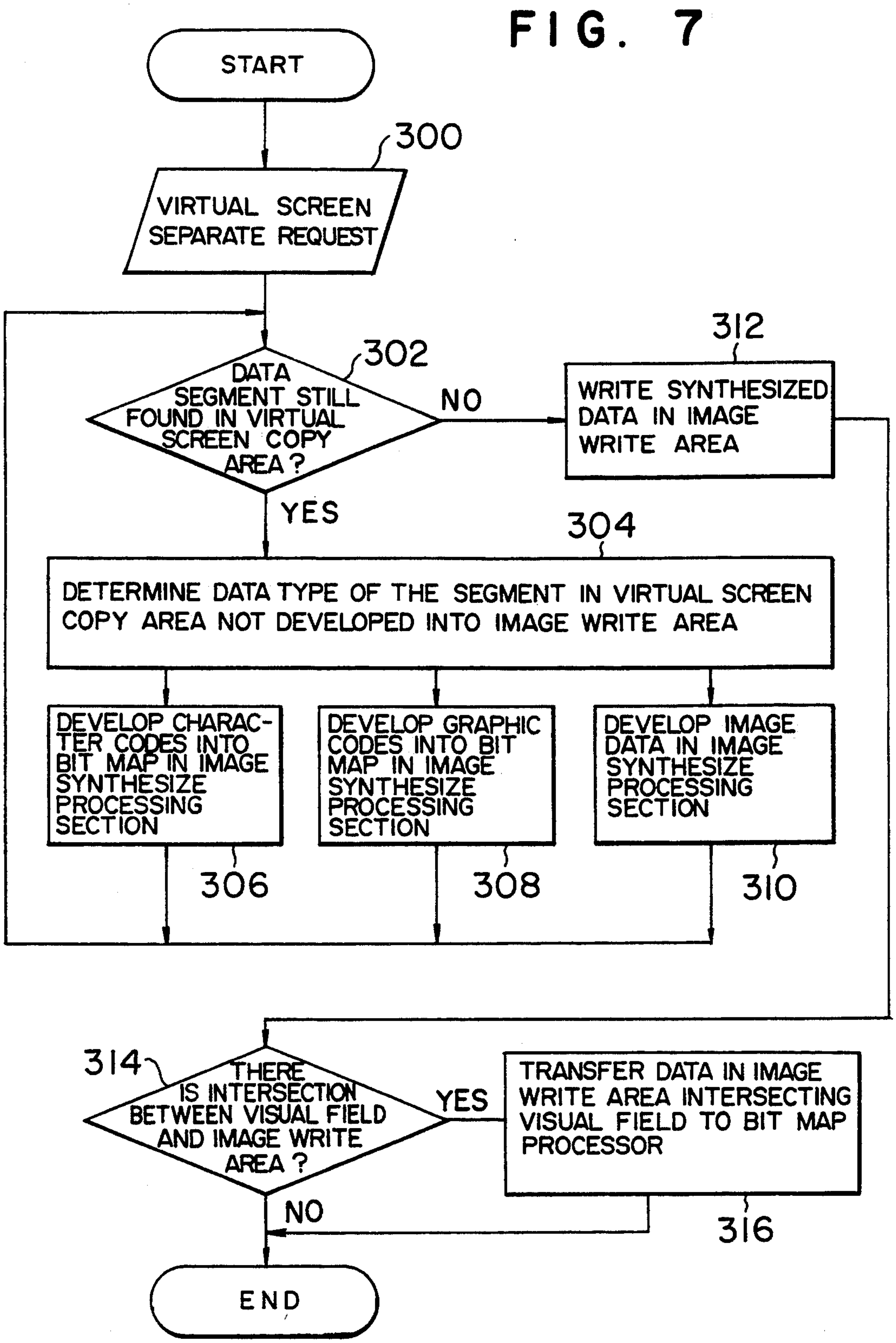
FIG. 7 is a flowchart illustrating a processing procedure of an image data combine processing.

FIG. 7 is a flowchart of processing effected by the virtual terminal controller 5 to copy the character, graphic, and image data stored in the virtual screen so as to synthesize image data.

First, when a virtual screen copy request is issued to the virtual terminal controller 5 (step 300), the virtual terminal controller 6 effects a retrieval in the virtual screen 4 to determine whether or not there exists a segment of character, graphic, or image data included in the virtual screen copy area 48 (step 302). If the virtual screen copy area 48 includes a segment which has not been developed into the image write area 47, the program checks to determine whether the segment contains the character code data, graphic code data, or image data (step 304). For the character code data, parameters such as a development region and character codes associated with the image write area 47 are sent to the image synthesize processing section 42 (step 306). For the graphic code data, parameters such as a development region and attributes including a line, a plane, and a marker are transmitted to the image synthesize processing section 42 (step 308). For the image data, parameters such as a development region associated with the image write area 47 and attributes of the image data are sent to the image synthesize processing area 42 (step 310).

The processing of the steps 302–310 is repeatedly executed until all data contained in the virtual screen copy area 48 is developed into the image write area 47. When all segments to be developed into the image write area 47 are completely processed, the synthesized image data is written in the image write area 47 (step 312).

Next, the bit map processor controller 9 checks to determine whether or not there exists an intersection between the virtual screen write area 47 and the visual field 56 (step 314). If the intersection exists, the bit map processor controller 9 attains a range of the intersection, information defining the visual field 56 and the window 57, and the like from the visible rectangle information table 29 and sends the obtained information data to the bit map processor 15 (step 316).

Figure 8:
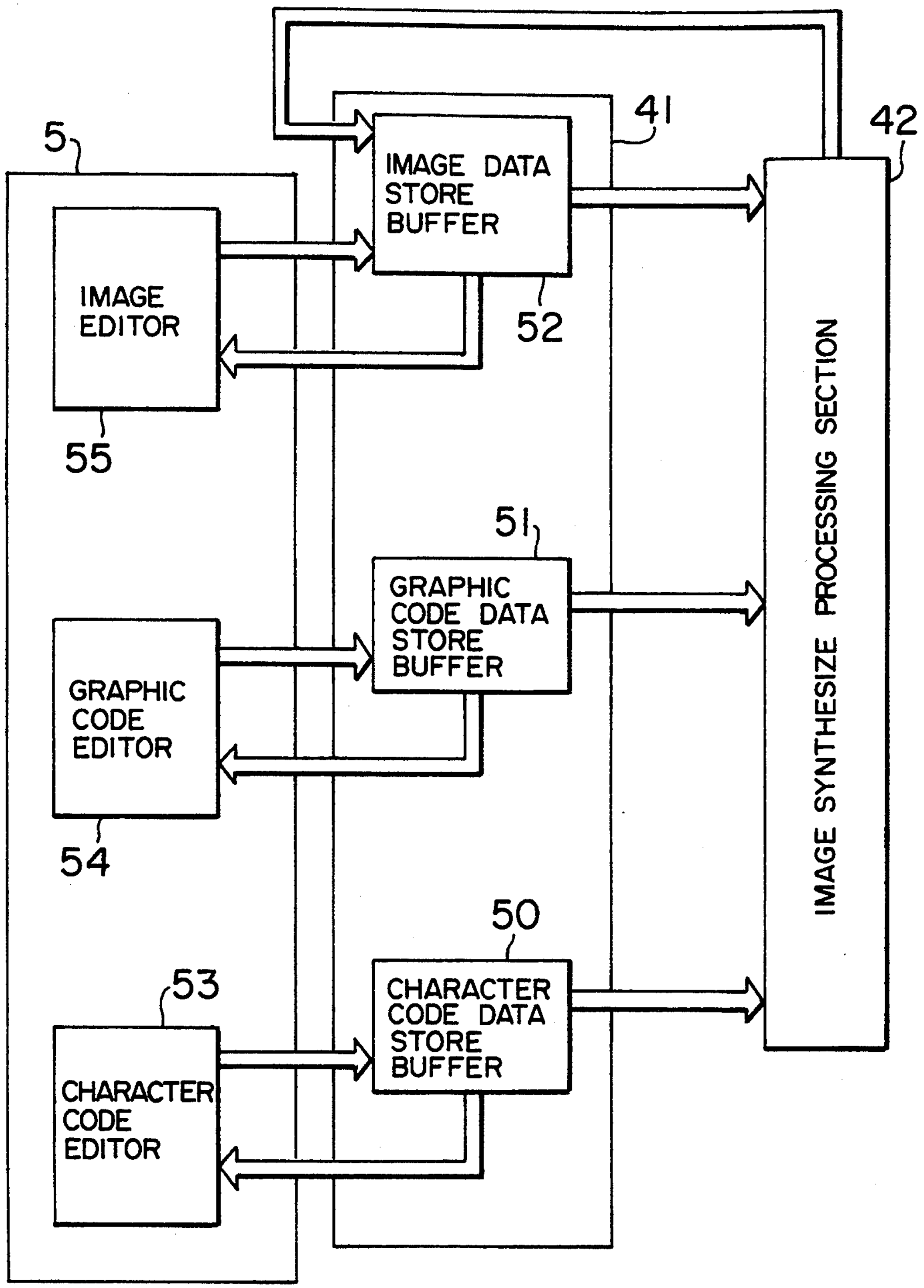
FIG. 8 is a data flow diagram showing a flow of data editing operation in a logical screen.

FIG. 8 is a data flow showing a flow of a data editing operation in the virtual screen according to the present invention. For the virtual screen 41, the virtual terminal controller 5 stores character codes in a character code data store buffer 50, loads a graphic code data store buffer 51 with graphic code data, and supplies image data to the image data store buffer 52. The data in the virtual memory 41 is processed as follows under control of the virtual terminal controller 5. Namely, the data of the code data store buffer 50, the graphic data store buffer 51, and the image data store buffer 52 can be edited by the character code editor 53, the graphic code editor 54, and the image editor 55, respectively.

In addition, the application program 100 instructs the image synthesize processing section 42 to combine data in the image data store buffer 52, the graphic code data store buffer 51, and the character code data store buffer 50 so as to generate image data, which is then stored in the image data store buffer. 52. The synthesized image data thus stored in the image data store buffer 52 can be edited by the image editor 55. The edit processing to be accomplished by the image editor 55 includes expansion/reduction, rotation, and inversion of an image and logical operations between image data.

According to the embodiment described above, in the virtual screen in which the character code data, graphic code data, and image data can be arranged and written at arbitrary positions, by using the character, graphic, and image data already existing in the virtual screen, new image data can be created as a drawing element for the virtual screen such that the image data thus attained is edited again for the further processing.

As can be seen from the foregoing description, according to the present invention, there is attained an effect that if a graphic image is drawn in a logical screen by mapping graphic elements from a plurality of virtual device coordinate systems, the layout of the graphic image can be varied only by changing the mapping ratio of the mapping from the respective virtual device coordinate systems onto the logical screen and by altering the positional relationships associated with the mapping onto the logical screen.

Furthermore, since the characters, graphics, and the like are kept in a form of the code data when effecting a multimedia display constituted with characters, graphics, and images, an edit operation can be achieved only by updating the code data; moreover, jobs associated with the image data edit processing, for example, an operation in which image data is synthesized, the resultant image data is displayed for confirmation, and another edit processing is executed with the attained image data or an operation to re-execute the synthesize processing of the image data can be easily effected at a high speed. This leads to an effect that a highly efficient image editing can be accomplished.

While the present invention has been described with reference to the particular illustrative embodiment, it is not restricted by the embodiment but only by the appended claims. It is to be appreciated that those skilled in the art can change and modify the embodiment without departing from the scope and spirit of the present invention.

The invention claimed is:

1. A display control apparatus for mapping data to be displayed on to a virtual screen using an application program and displaying a specified area of the virtual screen in a physical screen, said apparatus comprising:

first means for individually effecting a drawing operation using image data, vectorized graphic data and coded character data of said data to be displayed in a plurality of virtual devices, respectively, each virtual device having a virtual device space defined by a normalized coordinate system independent of a coordinate system of the physical screen, said image data, vectorized graphic data and coded character data being described according to at least said normalized coordinate system for use by said application program;

second means for mapping specified data of each of said virtual device spaces onto said virtual screen at desired map positions in a form of at least one of said image data, vectorized graphic data and coded character data, thereby generating new data;

third means for writing said new data in a specified area of a memory of said virtual screen;

fourth means for mapping said specified data, mapped on said virtual screen, onto said physical screen on a bit-map basis; and fifth means for displaying on a display equipment data of said physical screen.

2. A display control apparatus according to claim 1 wherein said first means controls segment data in a memory of said virtual screen corresponding to input data.

3. A display control apparatus according to claim 1, wherein said second means includes control table means for generating a physical screen control table indicating correspondence relationships between said memory of said virtual screen and a physical screen memory.

4. A display control apparatus according to claim 3 wherein said fourth means includes means for generating a command stream in said physical screen memory based on said physical screen control table.

5. A display control apparatus according to claim 4 wherein said fifth means includes means for effecting a dot development into a full dot memory based on the command stream located in the physical screen memory.

6. A display control method for mapping data to be displayed onto a virtual screen using an application program and displaying a specified area of the virtual screen in a physical screen, said method comprising the steps of:

individually effecting a drawing operation using image data, vectorized graphic data and coded character data of said data to be displayed in a plurality of virtual devices, respectively, each virtual device having a virtual device space defined by a normalized coordinate system independent of a coordinate system of the physical screen, said image data, vectorized graphic data and coded character data being described according to at least one of said normalized coordinate systems for use by said application program;

mapping specified data of each of said virtual device spaces onto said virtual screen at desired map positions in a form of at least one of said image data, vectorized graphic data and coded character data, thereby generating new data;

writing said new data in a specified area of a memory of said virtual screen;

mapping said specified data, mapped on said virtual screen, onto said physical screen on a bit-map basis; and displaying on a display equipment data of said physical screen.

7. A display control method according to claim 6, wherein said individually effecting step includes a step of controlling segment data in a memory of said virtual screen corresponding to input data.

8. A display control method according to claim 6, wherein said mapping specified data on said virtual screen step includes a step of generating a physical screen control table indicating correspondence relationships between said memory of said virtual screen a physical screen memory.

9. A display control method according to claim 8 wherein said mapping specified data on said physical screen step includes a step of generating a command stream in said physical screen memory based on said physical screen control table.

10. A display control method according to claim 9 wherein said displaying step includes a step of effecting a dot development into a full dot memory based on the command stream located in the physical screen memory.

11. A display control apparatus for mapping onto a memory of a virtual screen, data to be displayed and displaying a specified area of the virtual screen on a memory of a physical screen, said apparatus comprising:

first means, including a plurality of virtual devices each having a virtual device space defined by a normalized coordinate system, for drawing image data, coded character data and vectorized graphic data of said data to be displayed, respectively, on memory areas of said virtual device spaces under control of an application program, said normalized coordinate system of each of said virtual device spaces being independent from a coordinate system of the physical screen;

second means, coupled to said first means, for mapping a specified area of each of said plurality of virtual device spaces onto a memory area of said virtual screen at a specified position thereof;

said second means including third means for combining data already written in arbitrary areas of said virtual screen by superimposing elements of said data on top of each other in accordance with predetermined priorities to generate new data and for writing said new data in a specified memory area of said virtual screen;

fourth means for mapping said specified area of said virtual screen onto said physical screen; and fifth means for displaying data of said physical screen on a display device.

12. A display control apparatus for mapping onto a memory of a virtual screen, data to be displayed and displaying a specified area of the virtual screen on a memory of a physical screen, said apparatus comprising:

first means, including a plurality of virtual devices each having a virtual device space defined by a normalized coordinate system, for drawing image data, coded character data and vectorized graphic data of said data to be displayed, respectively, on memory areas of said virtual device spaces under control of an application program, said normalized coordinate systems of each of said virtual device spaces being independent from a coordinate system of the physical screen;

second means, coupled to said first means, for mapping a specified area of each of said plurality of virtual device spaces onto a memory area of said virtual screen at a specified position thereof;

third means for mapping said specified area of said virtual screen in said second means onto said physical screen; and fourth means for displaying data of said physical screen on a display device;

fifth means coupled between said second means and said third means for selectively combining data located in said memory area of the virtual screen by superimposing elements of said data on top of each other in accordance with predetermined priorities to produce new data of an image data type, and writing said new data in a specified memory area of said virtual screen.

13. A display control apparatus according to claim 12, wherein said fifth means comprises:

means for extracting data in a desired area of said second memory area and developing vectorized graphic data and coded character data, among said data extracted, into sets of image dots so as to convert said image dots into data of an image data type.

* * * * *